(12) United States Patent
Kursun

(10) Patent No.: US 10,956,075 B2
(45) Date of Patent: Mar. 23, 2021

(54) BLOCKCHAIN ARCHITECTURE FOR OPTIMIZING SYSTEM PERFORMANCE AND DATA STORAGE

(71) Applicant: BANK OF AMERICA CORPORATION, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 470 days.

(21) Appl. No.: 15/887,140

(22) Filed: Feb. 2, 2018

(65) Prior Publication Data

US 2019/0243572 A1    Aug. 8, 2019

(51) Int. Cl.
*G06F 3/06* (2006.01)

(52) U.S. Cl.
CPC ............ *G06F 3/0647* (2013.01); *G06F 3/061* (2013.01); *G06F 3/0632* (2013.01); *G06F 3/0673* (2013.01)

(58) Field of Classification Search
CPC .... G06F 3/0647; G06F 3/0673; G06F 3/0632; G06F 3/061; G06F 3/06; H04L 63/20; H04L 63/0407; H04L 2209/56; H04L 9/3239; H04L 2209/38
See application file for complete search history.

(56) References Cited

U.S. PATENT DOCUMENTS

| | | | |
|---|---|---|---|
| 5,224,173 A | 6/1993 | Kuhns et al. | |
| 5,276,772 A | 1/1994 | Wang et al. | |
| 5,325,466 A | 6/1994 | Kornacker | |
| 5,359,699 A | 10/1994 | Tong et al. | |
| 5,577,169 A | 11/1996 | Prezioso | |
| 5,819,226 A | 10/1998 | Gopinathan et al. | |
| 5,822,741 A | 10/1998 | Fischthal | |
| 6,330,546 B1 | 12/2001 | Gopinathan et al. | |
| 6,684,384 B1 * | 1/2004 | Bickerton | G06Q 40/02 717/108 |
| 7,815,106 B1 | 10/2010 | McConnell | |
| 8,245,282 B1 | 8/2012 | Buckwalter et al. | |
| 9,098,852 B1 | 8/2015 | Dangott et al. | |
| 9,185,095 B1 | 11/2015 | Moritz et al. | |
| 9,516,053 B1 | 12/2016 | Muddu et al. | |
| 9,727,723 B1 | 8/2017 | Kondaveeti et al. | |
| 10,460,320 B1 | 10/2019 | Cao et al. | |

(Continued)

*Primary Examiner* — Aleksandr Kerzhner
*Assistant Examiner* — Maher N Algibhah
(74) *Attorney, Agent, or Firm* — Michael A. Springs; Moore & Van Allen PLLC; R.W. McCord Rayburn

(57) ABSTRACT

Embodiments of the invention are directed to a block chain architecture for optimized system performance and data storage. The invention provides a unique structure comprising levels of interconnected chains that allow for dynamically configurable connections to be formed between the various nodes. Connections between the different of the hierarchy create a continuum of regions allowing for data to be moved across the spiral construction over time depending on the requirements of the data. In this way, storage and management of the data is optimized through a trade-off of data requirements as data moves between different levels of the spiral architecture based on user preference and, ultimately, to permanent data retirement and long-term storage. Further, the present invention provides a method of decentralized data storage across optimized storage regions within the block chain hierarchy.

24 Claims, 10 Drawing Sheets

(56) References Cited

U.S. PATENT DOCUMENTS

| | | |
|---|---|---|
| 2002/0133721 A1 | 9/2002 | Adjaoute |
| 2002/0161711 A1 | 10/2002 | Sartor et al. |
| 2007/0106582 A1 | 5/2007 | Baker et al. |
| 2007/0121596 A1 | 5/2007 | Kurapati et al. |
| 2007/0124256 A1 | 5/2007 | Crooks et al. |
| 2008/0059474 A1 | 3/2008 | Lim |
| 2010/0094767 A1 | 4/2010 | Miltonberger |
| 2010/0235908 A1 | 9/2010 | Eynon et al. |
| 2011/0055078 A1 | 3/2011 | Nandy |
| 2014/0058763 A1 | 2/2014 | Zizzamia et al. |
| 2014/0122325 A1 | 5/2014 | Zoldi et al. |
| 2014/0215612 A1 | 7/2014 | Niccolini et al. |
| 2014/0289867 A1 | 9/2014 | Bukai |
| 2015/0142595 A1 | 5/2015 | Acuna-Rohter |
| 2015/0186901 A1 | 7/2015 | Miltonberger |
| 2015/0363783 A1 | 12/2015 | Ronca et al. |
| 2016/0147583 A1 | 5/2016 | Ben Simhon et al. |
| 2017/0011460 A1* | 1/2017 | Molinari ............... G06F 21/645 |
| 2017/0134412 A1 | 5/2017 | Cheng et al. |
| 2017/0140141 A1 | 5/2017 | Yan et al. |
| 2017/0148024 A1 | 5/2017 | Yu et al. |
| 2017/0148027 A1 | 5/2017 | Yu et al. |
| 2017/0230418 A1 | 8/2017 | Amar et al. |
| 2018/0033010 A1 | 2/2018 | Ustinov et al. |
| 2018/0130034 A1 | 5/2018 | Taylor et al. |
| 2018/0130130 A1* | 5/2018 | Dechu ................... G06Q 40/04 |
| 2018/0189333 A1* | 7/2018 | Childress ............. H04L 9/3236 |
| 2018/0191759 A1 | 7/2018 | Baijal et al. |
| 2018/0232413 A1* | 8/2018 | Eshwar ................ H04L 9/3239 |
| 2018/0248904 A1 | 8/2018 | Villella et al. |
| 2018/0268491 A1* | 9/2018 | Cuomo .............. G06Q 10/0833 |
| 2018/0323974 A1* | 11/2018 | Gao ..................... H04L 9/3239 |
| 2019/0034465 A1* | 1/2019 | Shimamura ......... G06F 16/2474 |
| 2019/0116185 A1 | 4/2019 | Nagai et al. |
| 2019/0121988 A1* | 4/2019 | van de Ruit ........... G06Q 20/36 |
| 2019/0155513 A1* | 5/2019 | Maeda ................ G06F 16/2322 |
| 2019/0207751 A1* | 7/2019 | Harvey ................ H04L 67/104 |
| 2019/0228468 A1 | 7/2019 | Hu et al. |
| 2019/0280855 A1* | 9/2019 | Tong ..................... H04L 9/3297 |
| 2019/0370486 A1* | 12/2019 | Wang ................... G06Q 20/401 |
| 2020/0050595 A1* | 2/2020 | Sun ...................... H04L 9/3239 |
| 2020/0106621 A1* | 4/2020 | Eshwar ................ H04L 9/3239 |
| 2020/0175001 A1 | 6/2020 | Malan |

\* cited by examiner

BLOCKCHAIN ARCHITECTURE FOR OPTIMIZING SYSTEM PERFORMANCE AND DATA STORAGE

BACKGROUND

Block chain is a growing, highly-adaptive new technology that is already being implemented across multiple industries. As its implementation spreads, challenges such as in privacy, data immutability, energy efficiency, and data storage issues rise. As a result, there exists a need for an optimized block chain architecture that can maximize efficiency of the systems and devices participating on the block chain.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for implementing a spiral block chain architecture for optimized system performance and data storage. The invention may be exampled by a system which defines a specific embodiment of the invention. The system typically comprises: a plurality of nodes participating in a block chain hierarchy comprising a continuum of one or more interconnected regions, wherein the one or more interconnected regions in the continuum have differing data requirements for at least one of privacy, security, immutability, energy usage, time response and long-term storage; and a controller for dynamically generating one or more block chains for transferring and storing data across the one or more interconnected regions of the block chain hierarchy, the controller comprising one or more memory devices with computer-readable program code stored thereon, one or more communication devices connected to a network, and one or more processing devices, wherein the one or more processing devices are configured to execute the computer-readable program code to: receive the data within the block chain hierarchy; calculate one or more data requirements for the data and the one or more interconnected regions; based on calculating the one or more data requirements, determine an optimized block chain configuration for storage of the data within the one or more interconnected regions; and based on determining the optimized block chain configuration, assign the data to one or more of the regions defined by the optimized block chain configuration.

In some embodiments, the controller is further configured to: continuously monitor at least one of the data, the one or more block chains, and the one or more interconnected regions; determine a change in the one or more data requirements for the at least one of the data, the one or more block chains, and the one or more interconnected regions; and based on determining the change in the one or more data requirements, at least partially transfer the data across the continuum of interconnected regions, wherein the data associated with the change is stored in a new region associated with the change in the one or more data requirements.

In some embodiments, the system further comprises a data storage archive, wherein the controller is further configured to: gradually migrate the data across the continuum of interconnected regions based on the change in the one or more data requirements of the data over time; and transfer the data to the data storage archive for long-term storage.

In some embodiments, a smart contract is configured to control at least partial transfer of the data across the continuum of interconnected regions, and wherein the smart contract manages a full life-cycle of the data.

In some embodiments, the data stored in each of the one or more interconnected regions is controlled by a smart contract configured for each of the one or more interconnected regions.

In some embodiments, the controller is further configured to: extract and parse the data received within the block chain hierarchy into one or more data threads based on the one or more data requirements of each of the one or more data threads; generate data identifiers for linking the one or more data threads; and store a first data thread in a first region of the continuum of interconnected regions and a second data thread in a second region of the continuum of interconnected regions, wherein an operation executed on the first data thread registers in the second data thread.

In some embodiments, the controller is further configured to merge the one or more data threads based on a change in the one or more data requirements or after a predetermined time period.

In some embodiments, the controller is further configured to transfer the merged data threads to a data storage archive, wherein the merged data threads are removed from at least one block chain and the at least one block chain is truncated.

In some embodiments, the controller is further configured to integrate the one or more data threads, wherein the data is reconstructed.

In some embodiments, the first region comprises a permissioned region, and wherein the first data thread of the data stored in the permissioned region can be validated by the second data thread of the data stored in the second region.

In some embodiments, monitoring the at least one of the data, the one or more block chains, and the one or more interconnected regions for changes in the one or more data requirements further comprises executing adversarial outlining on the one or more interconnected regions of the block chain hierarchy to determine a health of the at least one of the data, the one or more block chains, and the one or more interconnected regions.

In some embodiments, one or more blocks of the block chain hierarchy participate simultaneously on more than one block chain.

In some embodiments, a plurality of block chains of the block chain hierarchy share a larger block chain communally.

Embodiments of the invention are further directed to a computer-implemented method for storing data on a plurality of data threads within a block chain hierarchy comprising a continuum of interconnected regions with differing data requirements for at least one of privacy, security, immutability, energy usage, time response and long-term storage, wherein one or more block chains are dynamically configured for storage and transfer of the data across the continuum of interconnected regions, the method comprising: receiving the data within the block chain hierarchy; extracting and parsing the data received within the block chain hierarchy into one or more data threads based on one or more data requirements of each of the one or more data threads, wherein the one or more data threads have different data requirements; and storing the one or more data threads within different regions of the continuum of interconnected regions based on the different data requirements of the one or more threads.

In some embodiments, extracting and parsing the data into the one or more data threads further comprises: generating data identifiers for linking the one or more data threads; and storing a first data thread in a first region of the continuum of interconnected regions and a second data thread in a second region of the continuum of interconnected regions, wherein an operation executed on the first data thread registers in the second data thread.

In some embodiments, the method further comprises merging the one or more data threads based on a change in the one or more data requirements or after a predetermined time period.

In some embodiments, the method further comprises transferring the merged data threads to a data storage archive, wherein the merged data threads are removed from at least one block chain and the at least one block chain is truncated.

Embodiments of the invention are further directed to a system implementing a dynamically curated block chain architecture, the system comprising: a plurality of nodes participating in a block chain hierarchy forming a continuum of one or more interconnected regions, wherein the one or more interconnected regions in the continuum have differing data requirements; and a controller for executing one or more smart contracts within the block chain hierarchy, the controller being configured to: assign at least one smart contract to each of the one or more interconnected regions of the block chain hierarchy, wherein the at least one smart contract dynamically controls storage and movement of data within each of the one or more interconnected regions based on the differing data requirements.

In some embodiments, an additional smart contract is configured to dynamically control the movement of the data across the continuum of interconnected regions, and wherein the additional smart contract manages a full life-cycle of the data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
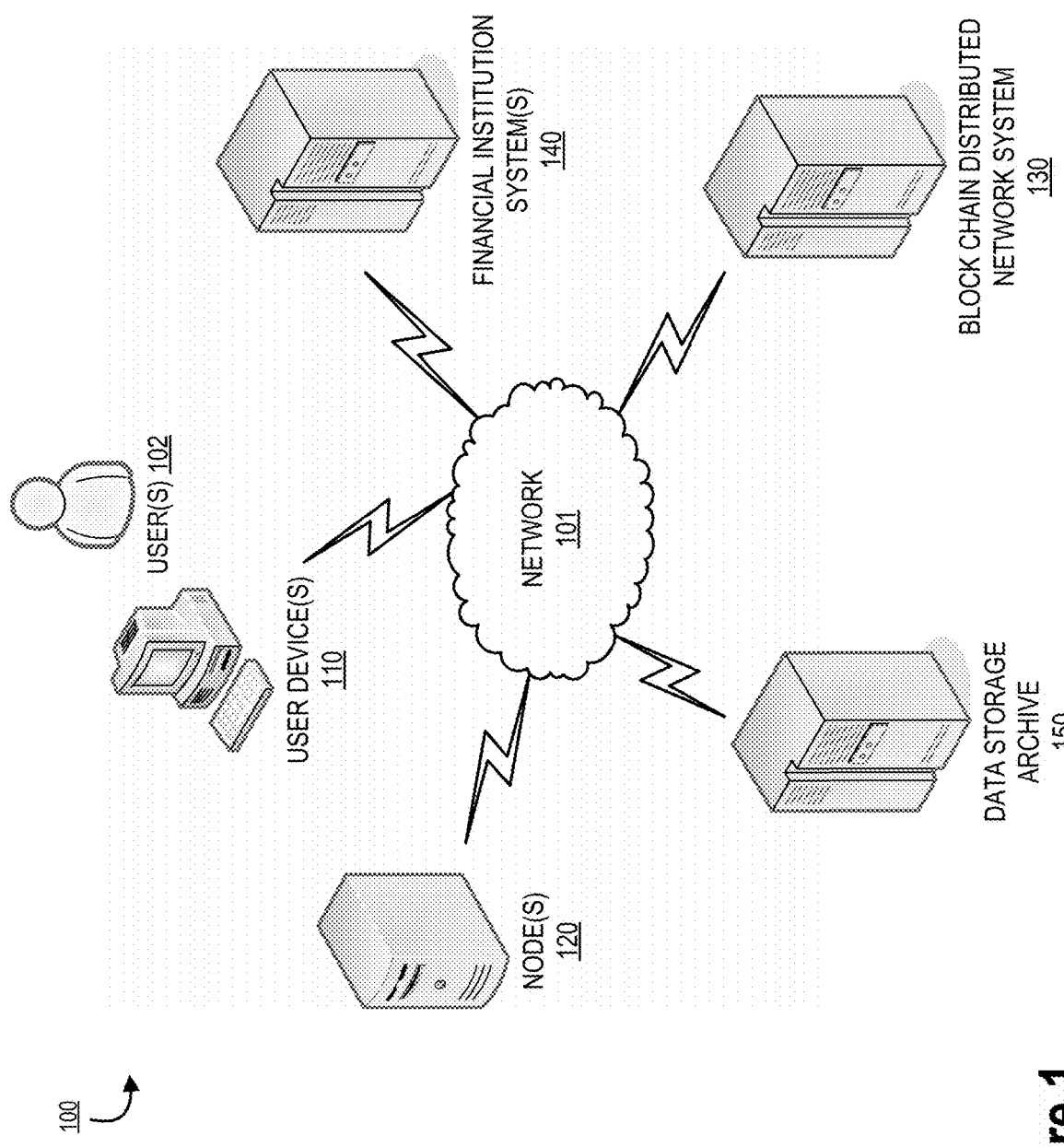
Figure 2:
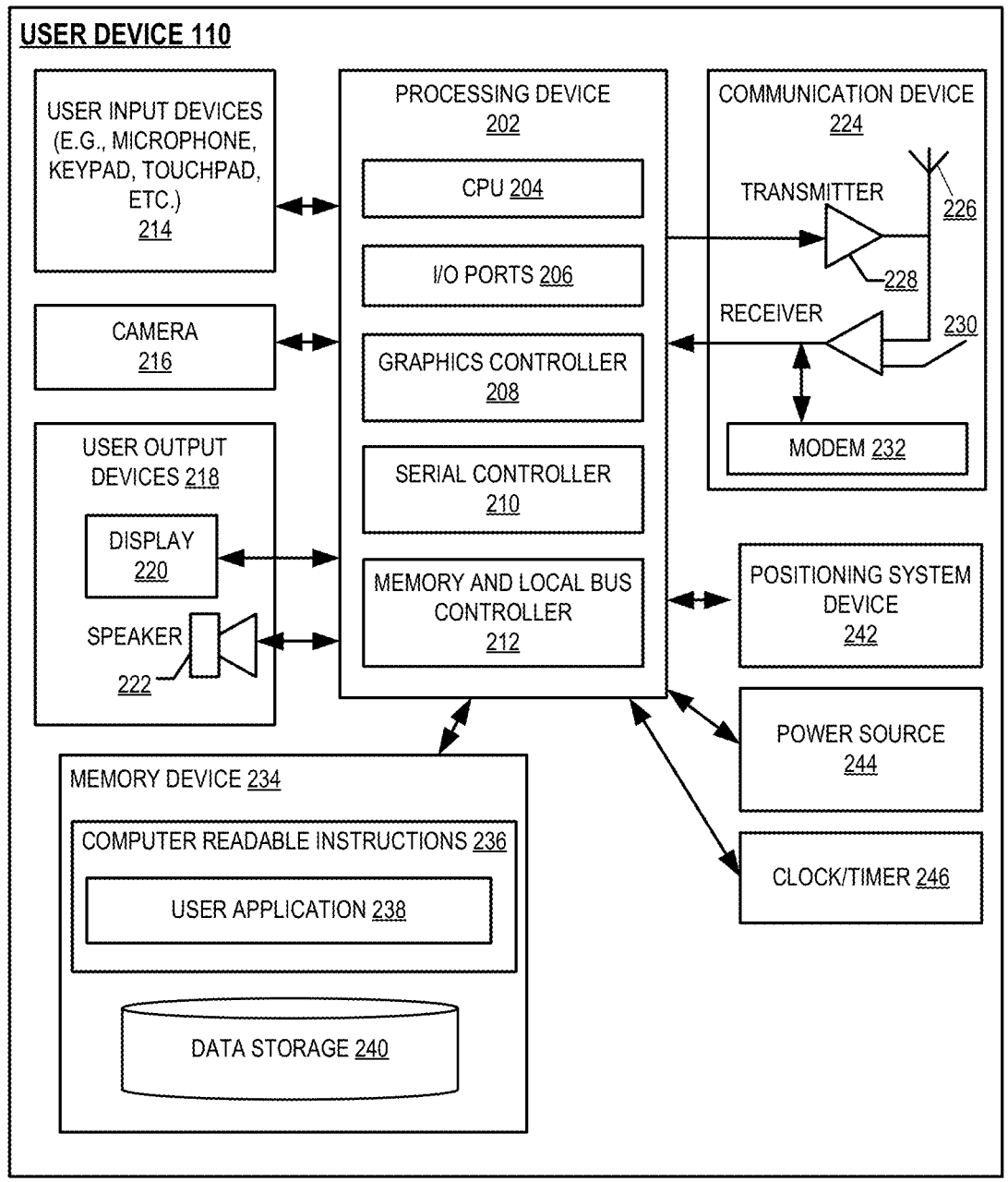
Figure 3:
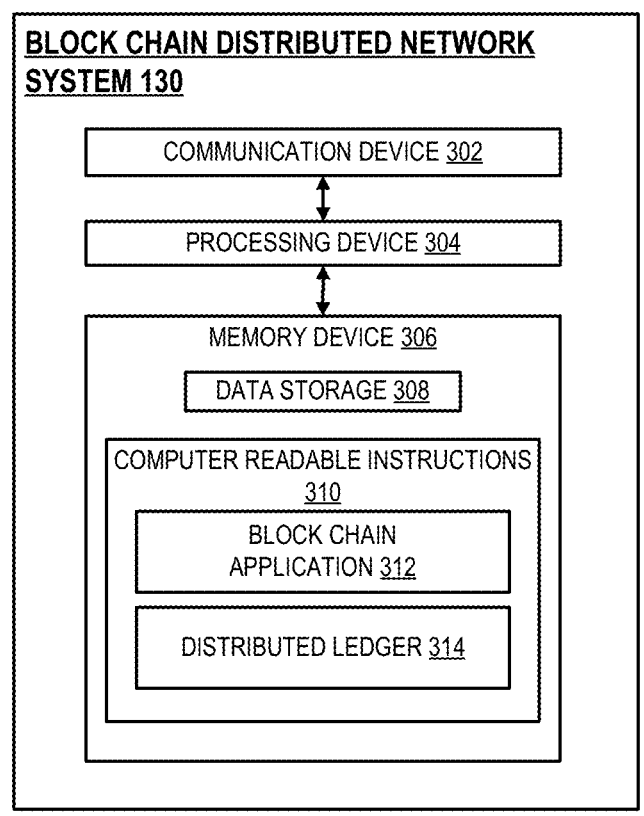
Figure 4A:
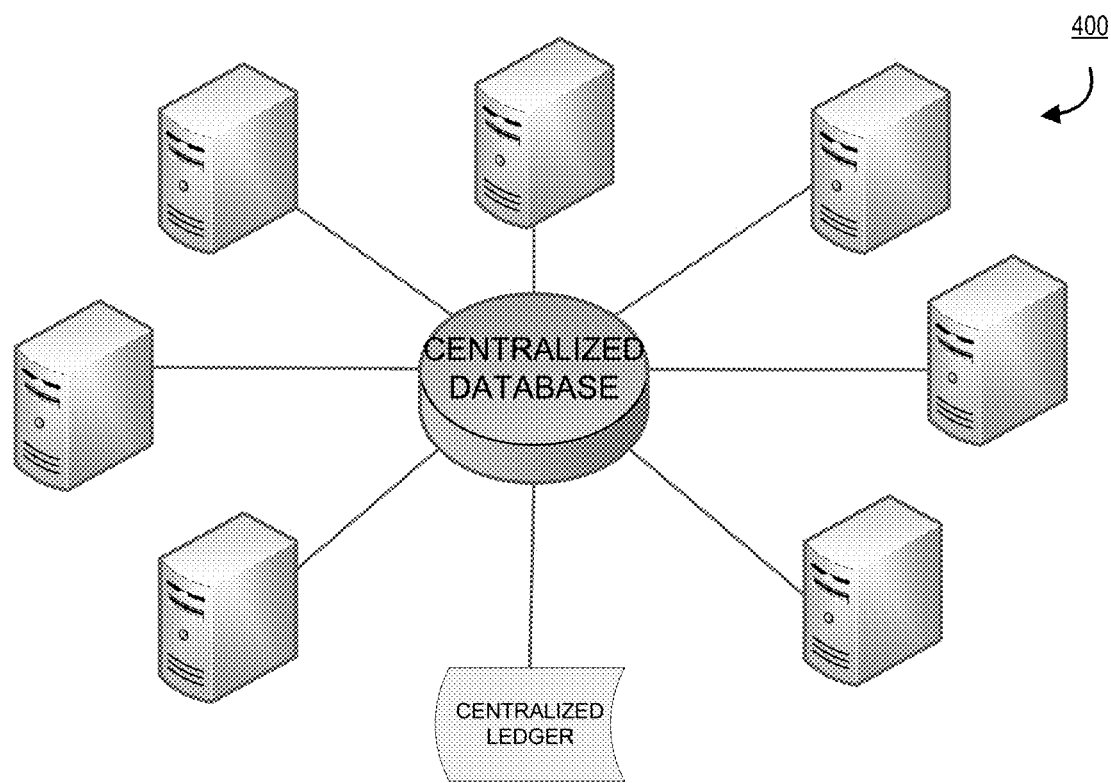
Figure 4B:
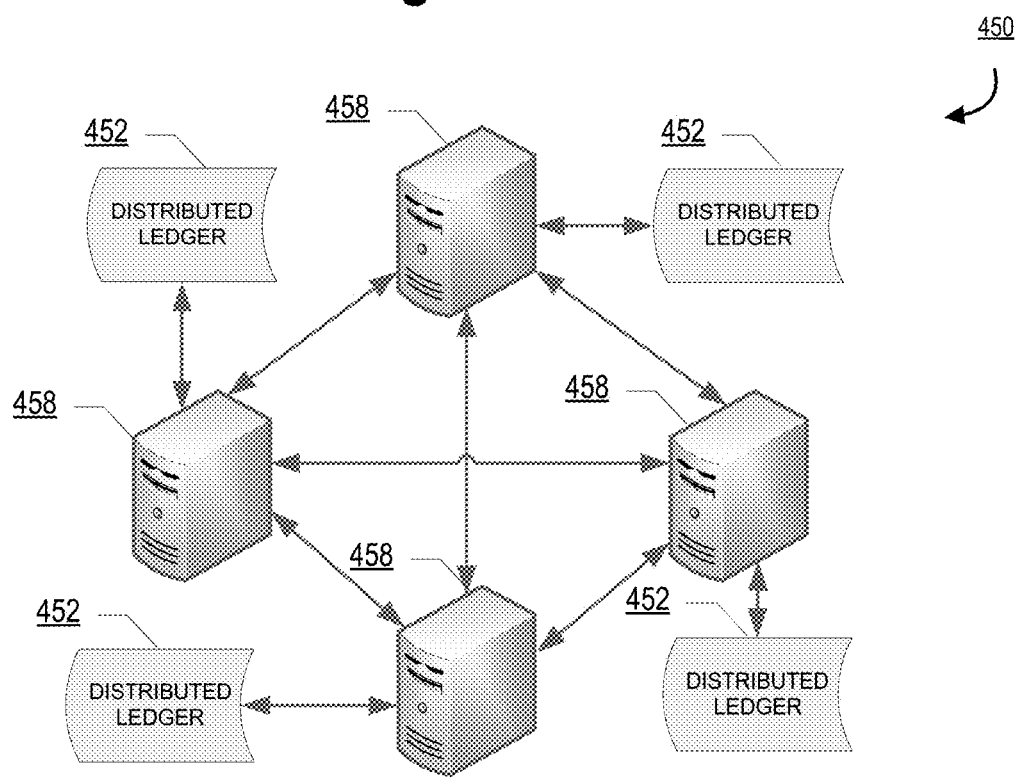
Figure 5:
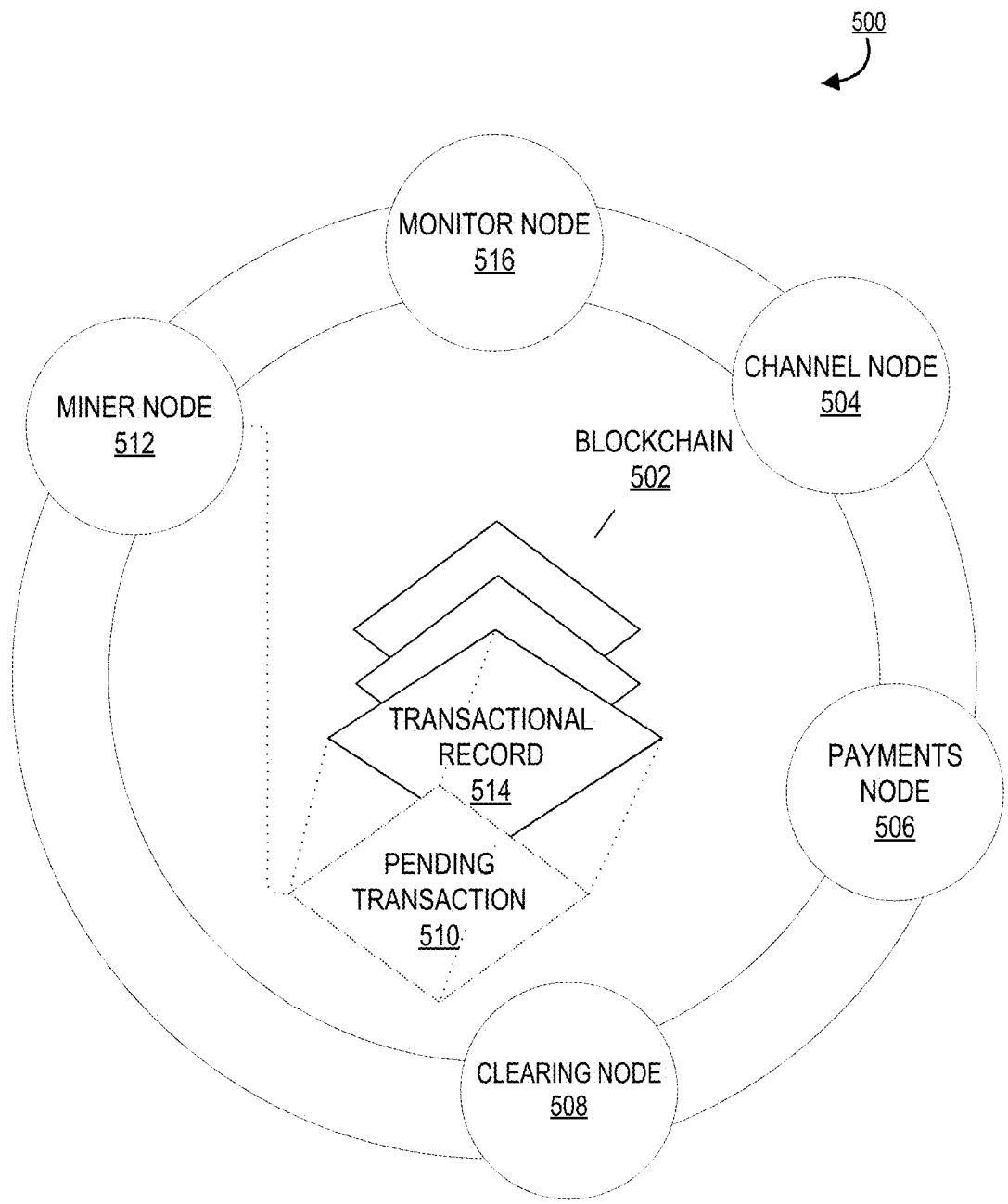
Figure 6:
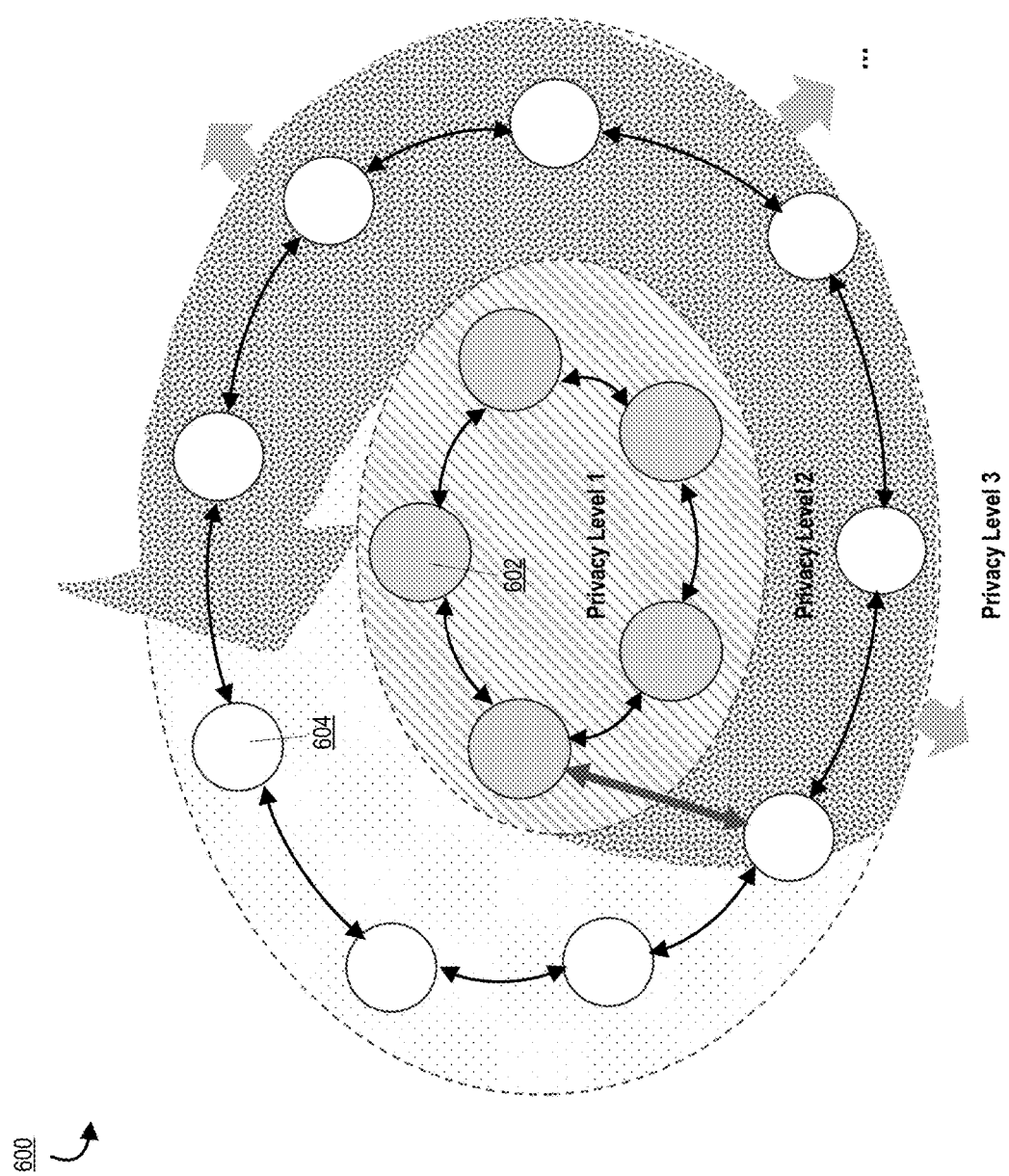
Figure 7:
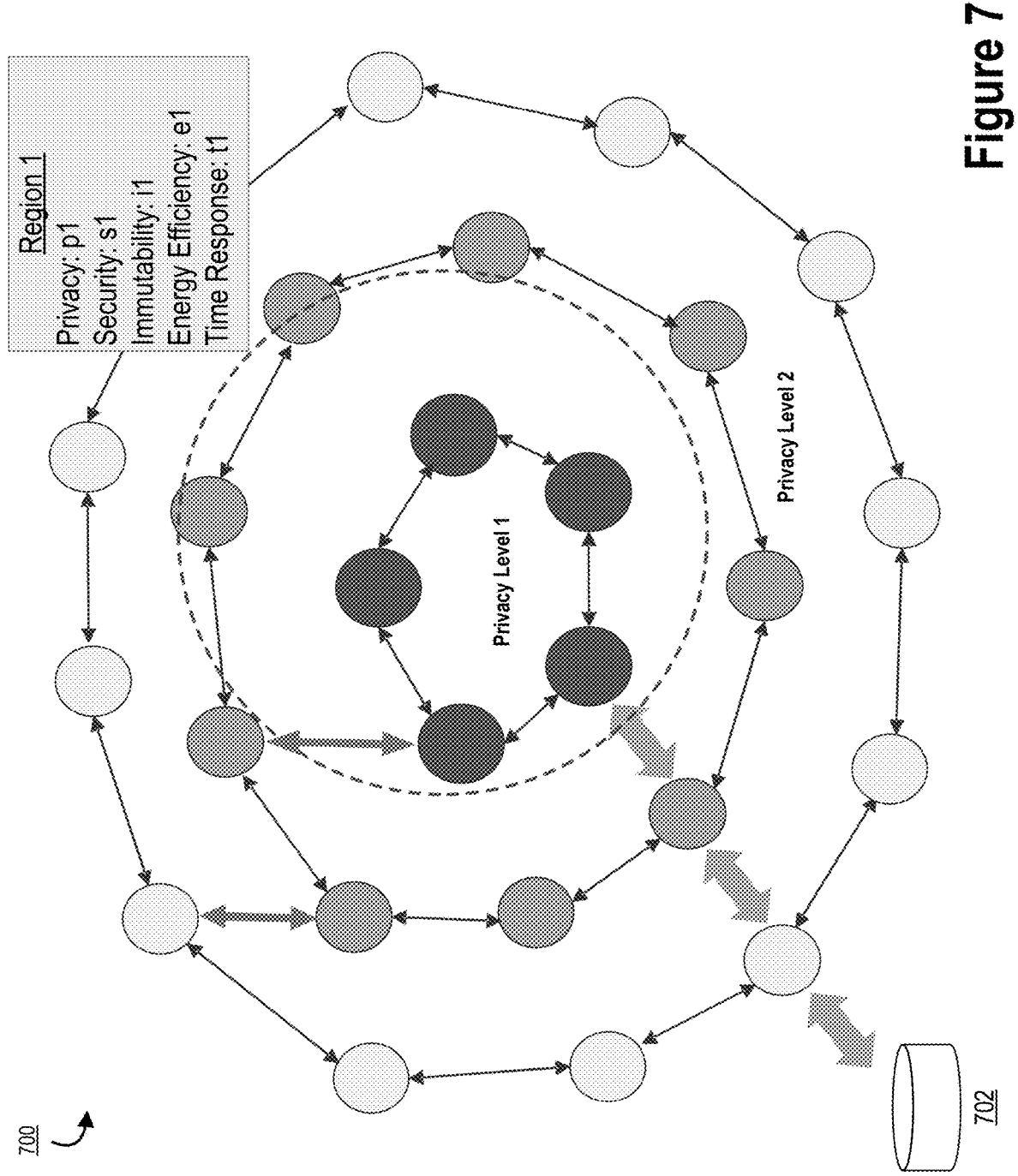
Figure 8:
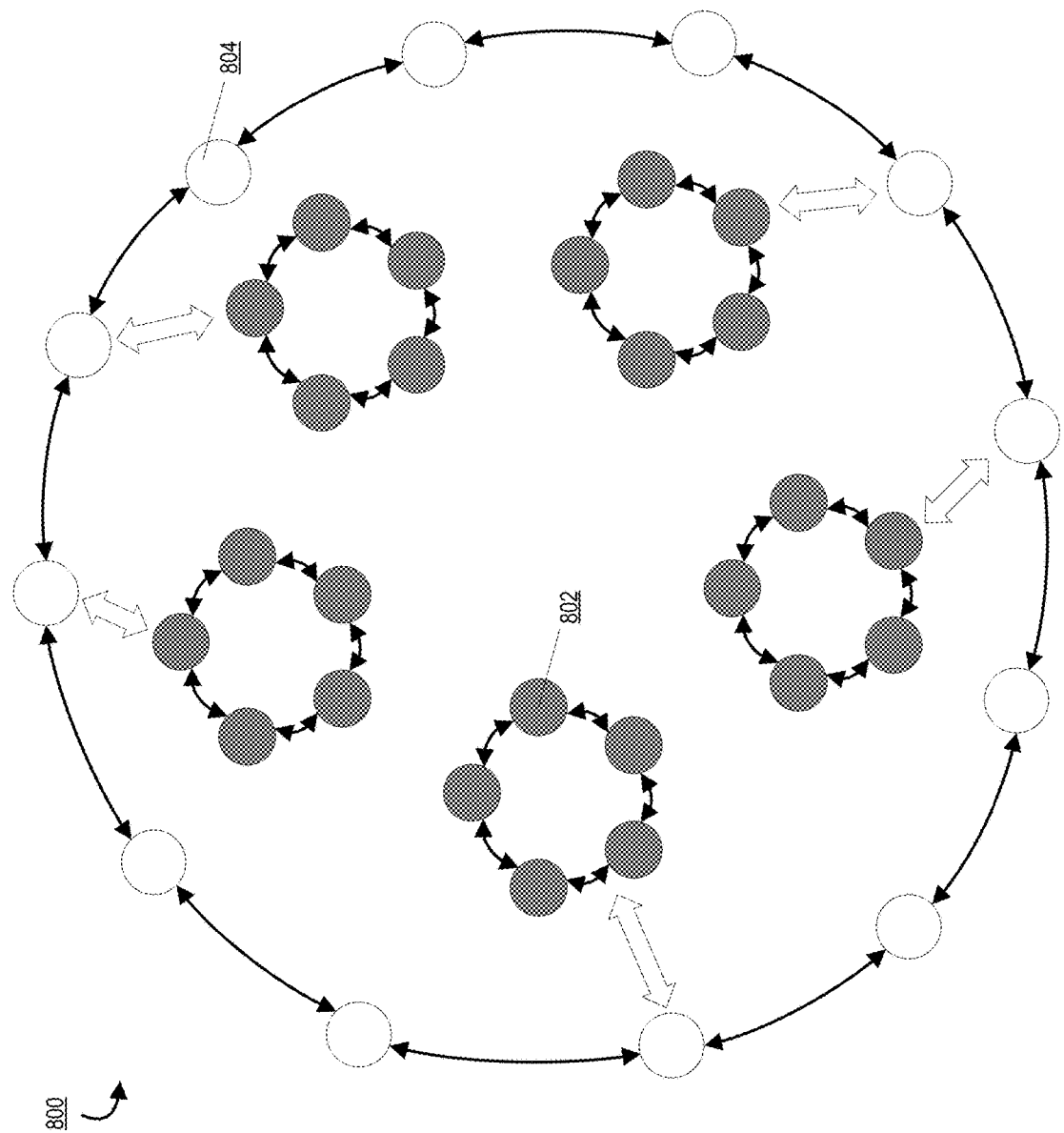
Figure 9:
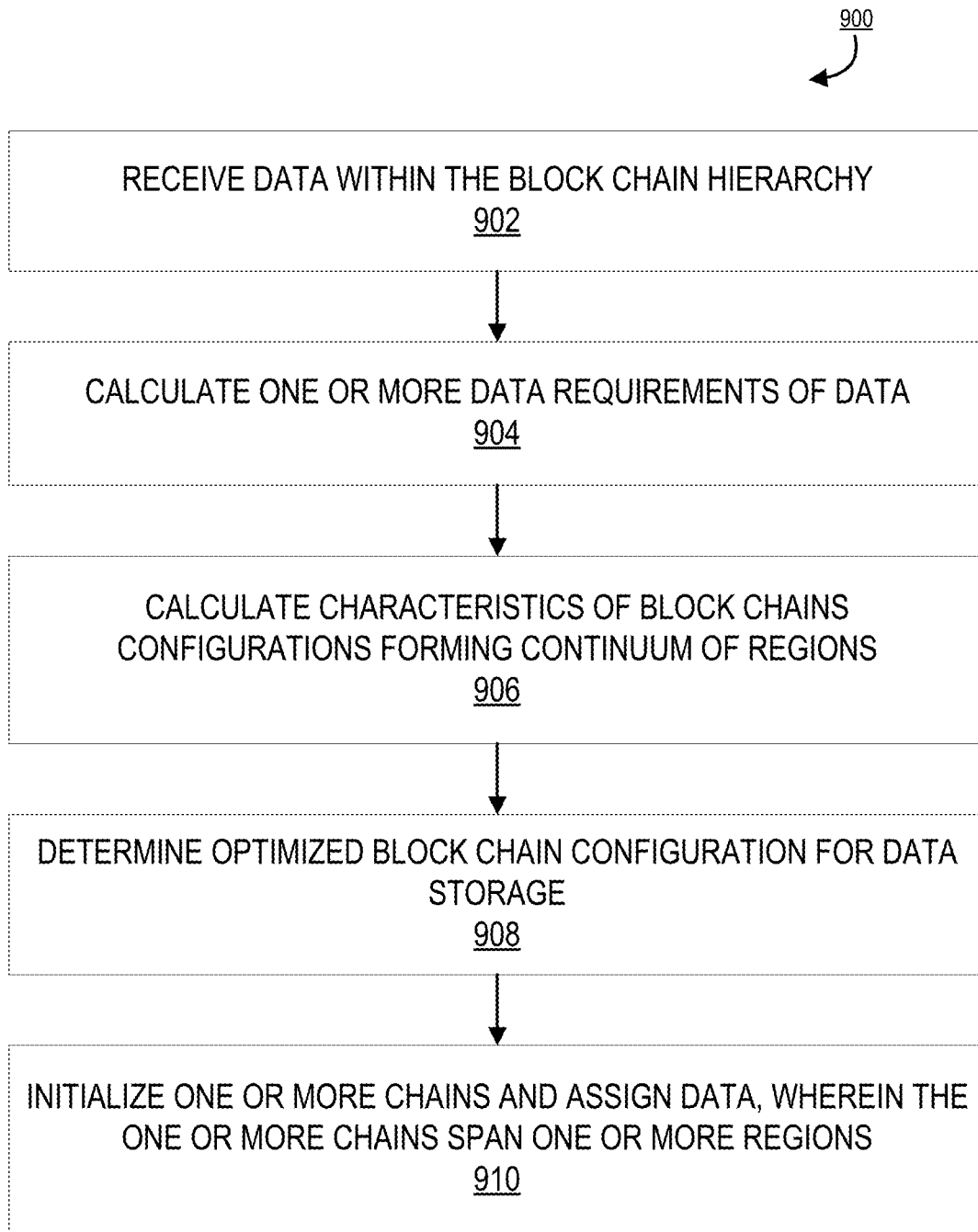
Figure 10:
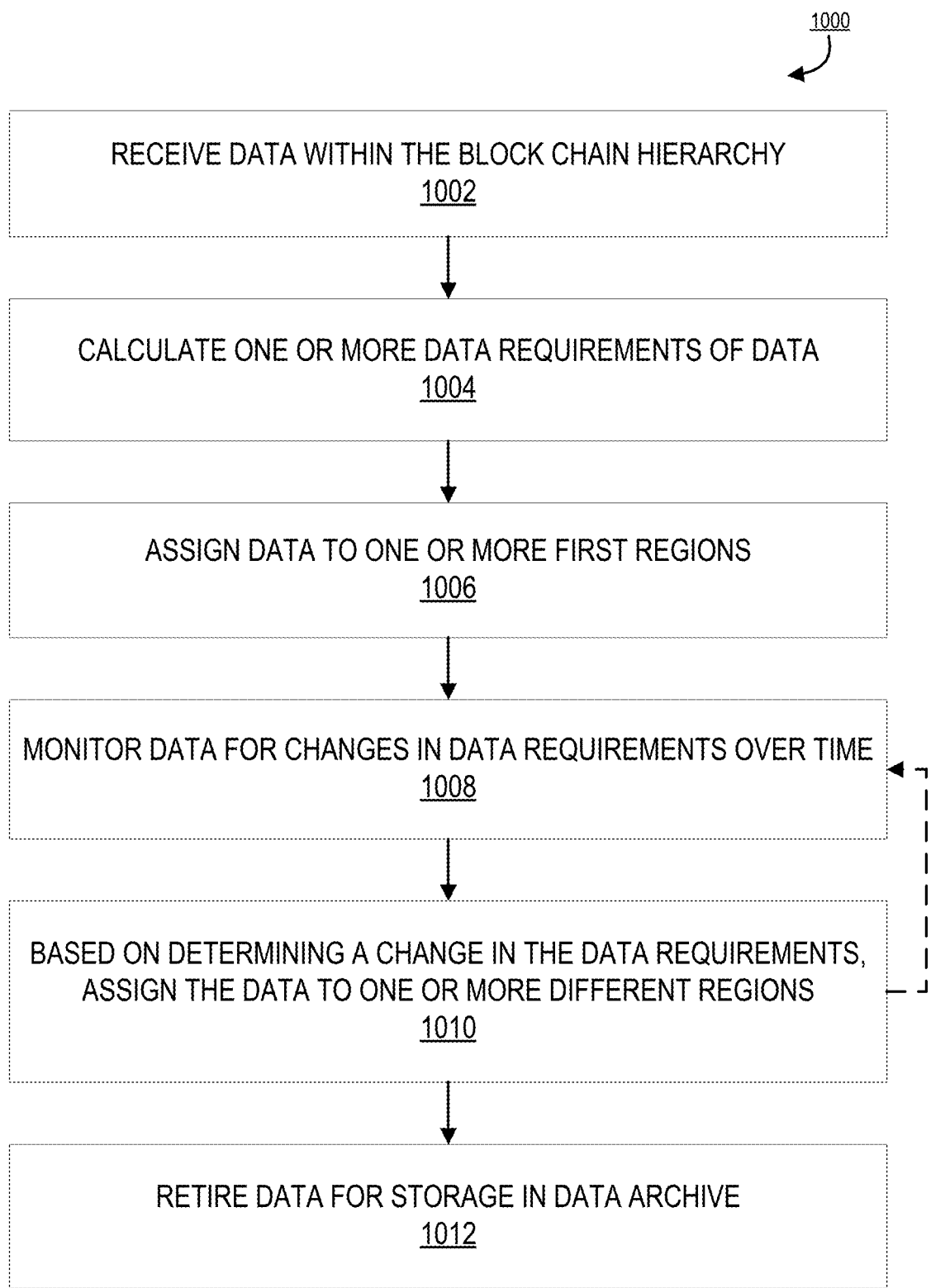

Having thus described embodiments of the invention in general terms, reference will now be made to the accompanying drawings, wherein:

FIG. 1 provides a spiral block chain system environment, in accordance with one embodiment of the invention;

FIG. 2 provides a block diagram of a user device, in accordance with one embodiment of the invention;

FIG. 3 provides a block diagram of the block chain distributed network system, in accordance with one embodiment of the invention;

FIG. 4A provides a centralized database architecture environment, in accordance with one embodiment of the invention;

FIG. 4B provides a high level block chain system environment architecture, in accordance with one embodiment of the invention;

FIG. 5 provides a high level process flow illustrating node interaction within a block chain system environment architecture, in accordance with one embodiment of the invention;

FIG. 6 provides a block diagram for illustrating a block chain hierarchy implementing a spiral chain architecture, in accordance with one embodiment of the invention;

FIG. 7 provides a block diagram for illustrating one or more regions of a block chain hierarchy implementing a spiral chain architecture and data migration, in accordance with one embodiment of the invention;

FIG. 8 provides a block diagram for illustrating a shared spiral chain for a plurality of block chains, in accordance with one embodiment of the invention;

FIG. 9 provides a high level process map illustrating the implementation and initialization of a spiral block chain architecture for optimized data storage and resource usage, in accordance with one embodiment of the invention; and FIG. 10 provides a high level process map illustrating the storage, monitoring, and continuous migration of data within a block chain hierarchy implementing a spiral block chain architecture, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned. In some embodiments, a device may refer to an entity's computer system, platform, servers, databases, networked devices, or the like. The device may be used by the user to access the system directly or through an application, online portal, internet browser, virtual private network, or other connection channel. The device may be a computer device within a network of connected computer devices that share one or more network storage locations.

As used herein, the term "computing resource" or "computing hardware" may be used to refer to elements of one or more computing devices, networks, or the like available to be used in the execution of tasks or processes. A computing resource may include processor, memory, network bandwidth and/or power used for the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison or nodes of a distributed computing cluster).

A "user" as used herein may refer to any entity or individual associated with the spiral block chain system. In some embodiments, a user may be a computing device user, a phone user, a mobile device application user, a financial institution customer (e.g., an account holder or a person who has an account (e.g., banking account, credit account, or the like)), a system operator, database manager, a support technician, and/or employee of an entity. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

In accordance with embodiments of the invention, the term "entity" may be used to include any organization or collection of users that may interact with the spiral block chain system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

"Authentication information" is any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing device, or the like to access, write, delete, copy, or modify data within at least a portion of the system.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module (such as the robotic process automation module and/or the entity platform described herein) may monitor a user input into the system. In further embodiments, the system may store said user input during an interaction in order to substantially replicate said user input at another time.

As used herein, a "connection" or an "interaction" may refer to any communication between one or more users, one or more entities or institutions, and/or one or more devices, nodes, clusters, or systems within the system environment described herein. For example, an interaction may refer to a transfer of data between systems or devices, an accessing of stored data by one or more devices, a transmission of a requested task, a reporting and correction of an error, or the like. In another example, an interaction may refer to a user interaction with a user device through a user interface in order to connect or communicate with an entity and/or entity system to complete an operation (e.g., request a transfer of funds from an account, complete a form, or the like).

The terms "block chain," "blockchain," or "distributed ledger," as used herein, refer to a decentralized electronic ledger of data records which are authenticated by a federated consensus protocol. Multiple computer systems within the block chain, referred to herein as "nodes" or "compute nodes," each comprise a copy of the entire ledger of records. Nodes may write a data "block" to the block chain, the block comprising data regarding a transaction, said blocks further comprising data and/or metadata. In some embodiments, only miner nodes may write transactions to the block chain. In other embodiments, all nodes have the ability to write to the block chain. In some embodiments, the block may further comprise a time stamp and a pointer to the previous block in the chain. In some embodiments, the block may further comprise metadata indicating the node that was the originator of the transaction. In this way, the entire record of transactions is not dependent on a single database which may serve as a single point of failure; the block chain will persist so long as the nodes on the block chain persist. A "private block chain" or "permissioned" is a block chain in which only authorized nodes may access the block chain. In some embodiments, nodes must be authorized to write to the block chain. In some embodiments, nodes must also be authorized to read from the block chain. Once a transactional record is written to the block chain, it will be considered pending and awaiting authentication by the miner nodes in the block chain.

A "block" as used herein may refer to one or more records of a file with each record comprising data for transmission to a server. In some embodiments, the term record may be used interchangeably with the term block to refer to one or more transactions or data within a file being transmitted. In particular, the block chain begins with a genesis block and is subsequently lengthened by appending blocks in series to the genesis block. Generally, the data within each block within the block chain may not be modified by the nodes of the block chain; data may only be added through the addition of a block to the last block in the block chain. Each block added to the block chain may comprise a timestamp and a pointer to the previous block in the block chain. In this way, the block chain may provide an immutable record of data records over a period of time. In some embodiments, in order for a new block to be added to the block chain, a pending data record may be proposed to be added to the block chain. The nodes may then, via a "consensus algorithm" or "consensus mechanism," come to a consensus as to the contents of the data in the block chain. Once a consensus has been reached by the nodes that the pending data record is valid, the nodes append the data record to the last block in the block chain. In this way, each node maintains a validated copy of the block chain such that the block chain may remain accessible even if one or more nodes become unavailable (e.g. a node is offline due to maintenance, malfunction, etc.) and may further account for divergence from the true copy of the block chain which may occur at the node level (e.g. a copy of the block chain on a particular node becomes invalid due to data corruption, malicious editing, and the like). In other words, the consensus mechanism ensures that, over time, each node hosts a copy of the block chain that is consistent with the other nodes.

Embodiments of the invention as described herein may utilize one, several, or a combination (i.e. hybrid) of a number of different consensus algorithms to ensure the integrity of the data within the block chain. In some embodiments, the consensus mechanism may be a "proof of work" ("PoW") algorithm, in which the nodes perform a series of calculations to solve a cryptographic puzzle. For instance, in order to validate a pending data record, the nodes may be required to calculate a hash via a hash algorithm (e.g. SHA256) which satisfies certain conditions set by the system. Calculating a hash in this way may be referred to herein as "mining," and thus a node performing the mining may be referred to as "miners" or "miner nodes."

"Miner node" as used herein refers to a networked computer system or device that authenticates and verifies the integrity of pending transactions on the block chain. The miner node ensures that the sum of the outputs of the transaction within the block matches the sum of the inputs. In some embodiments, a pending transaction may require validation by a threshold number of miner nodes. Once the threshold number of miners has validated the transaction, the block becomes an authenticated part of the block chain. By using this method of validating transactions via a federated consensus mechanism, duplicate or erroneous transactions are prevented from becoming part of the accepted block chain, thus reducing the likelihood of data record tampering and increasing the security of the transactions within the system. In some embodiments, one or more user devices may function as miner nodes within the system.

Embodiments of the invention provide a technical solution to a problem by utilizing computing devices in non-conventional, non-obvious ways. The present invention provides a spiral block chain architecture comprising levels of interconnected chains that allow for dynamically configurable connections to be formed between the various chains contained therein. Connections between the different layers of the hierarchy create a continuum of interconnected regions allowing for data to be moved across regions, chains, or nodes of the spiral construction over time depending on the requirements of the data. In this way, storage and management of the data is optimized through a trade-off of data requirements as data moves between different levels of the spiral architecture based on the requirements set by the user.

Further, the present invention solves a problem inherent to permissioned block chains by providing a secure method of validation for private data thereby ensuring data immutability and security. By generating and storing data identifiers (e.g., meta-data and the like) in a public chain, enough data is made available on the public chain for ensuring immutability of the permissioned chain while maintaining privacy.

FIG. 1 provides a system that includes specialized systems and devices communicably linked across a distributive network of nodes required to perform the functions of implementing the spiral block chain architecture as described herein. FIG. 1 provides a spiral block chain system environment 100, in accordance with one embodiment of the present invention. As illustrated in FIG. 1, the block chain distributed network system 130 is operatively coupled, via a network 101 to the user device 110, nodes 120, the financial institution system 140, and the data storage archive 150. In this way, the block chain distributed network system 130 can send information to and receive information from the user device 110, nodes 120, financial institution system 140, and the data storage archive 150. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual or system that desires to implement the benefits of the spiral block chain architecture and data storage and management system over the network 101, such as by automatically migrating data through the structure over time. In some embodiments a user 102 is a user or entity completing a transaction to be recorded on a block chain. In other embodiments, the user 102 is a user or entity managing data storage on the block chain. In some embodiments, the user 102 has a user device 110, such as a mobile phone, tablet, or the like that may interact with and control the recordation and validation of blocks on the block chain through interaction with the devices and systems of the environment 200.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a block diagram of a user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like, one or more chips, and the like. The processing device 202 may further include a central processing unit 204, input/output (I/O) port controllers 206, a graphics controller or GPU 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with content provided from an entity. In some embodiments, the user application 238 further includes a client for altering data requirements of data on the block chain. The user application 238 may also allow the user to manage data stored on the block chain by altering data requirements of the data and determining storage location and parameters.

The processing device 202 may be configured to use the communication device 224 to communicate with one or more other devices on a network 101 such as, but not limited to the block chain distributed network system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes a financial institution system 140 (as illustrated in FIG. 1) which is connected to the user device 110, the nodes 120, the block chain distributed network system 130, and the data storage archive 150 and may be associated with one or more financial institutions or financial entities. In this way, while only one financial institution system 140 is illustrated in FIG. 1, it is understood that multiple network systems may make up the system environment 100. The financial institution system 140 generally comprises a communication device, a processing device, and a memory device. The financial institution system 140 comprises computer-readable instructions stored in the memory device, which in one embodiment includes the computer-readable instructions of a financial institution application. The financial institution system 140 may communicate with the user device 110, the nodes 120, the block chain distribute network system 130, and the data storage archive 150 to, for example, complete transactions on the block chain.

The nodes 120, and the data storage archive 150 comprise the same or similar features as the user device 110 and the financial institution system 140. In some embodiments, the nodes 120 may be user devices 110 forming a plurality of networked devices participating in a block chain environment. The data storage archive 150 is typically used for long term data storage for data on a block chain, wherein data may be moved to the data storage archive for permanent storage or storage off of the block chain or with limited block chain characteristics.

FIG. 3 provides a block diagram of the block chain distributed network system 130, in accordance with one embodiment of the invention. The block chain distributed network system 130 generally comprises a communication device 302, a processing device 304, and a memory device 306. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 306 is operatively coupled to the communication device 302 and the memory device 306. The processing device 304 uses the communication device 302 to communicate with the network 101 and other devices on the network 101, such as, but not limited to the user device 110, the nodes 120, the financial institution system 140 and the data storage archive 150. As such, the communication device 302 generally comprises a modem, server, or other device for communicating with other devices on the network 101.

As further illustrated in FIG. 3, the block chain distributed network system 130 comprises computer-readable instructions 310 stored in the memory device 306, which in one embodiment includes the computer-readable instructions 310 of a block chain application 312. In some embodiments, the memory device 306 includes data storage 308 for storing data related to the system environment, but not limited to data created and/or used by the block chain application 312.

Embodiments of the block chain distributed network system 130 may include multiple systems, servers, computers or the like maintained by one or many entities. FIG. 3 merely illustrates one of those systems that, typically, interacts with many other similar systems to form the block chain. The block chain distributed network system 130 will be outlined below in more detail with respect to FIGS. 4-6. In some embodiments, financial institution systems 140 may be part of the block chain. Similarly, in some embodiments, the block chain distributed network system 130 is part of a financial institution system 140. In other embodiments, the financial institution system 140 is distinct from the block chain distributed network system 130. The block chain distributed network system 130 may communicate with the financial institution system 140 via a secure connection generated for secure encrypted communications between the two systems.

In one embodiment of the block chain distributed network system 130 the memory device 306 stores, but is not limited to, a block chain application 312 and a distributed ledger 314. In some embodiments, the distributed ledger 314 stores data including, but not limited to, at least portions of a transaction record. In one embodiment of the invention, both the block chain application 312 and the distributed ledger 314 may associate with applications having computer-executable program code that instructs the processing device 304 to operate the network communication device 302 to perform certain communication functions involving described herein. In one embodiment, the computer-executable program code of an application associated with the distributed ledger 314 and block chain application 312 may also instruct the processing device 304 to perform certain logic, data processing, and data storing functions of the application.

The processing device 304 is configured to use the communication device 302 to gather data, such as data corresponding to transactions, blocks or other updates to the distributed ledger 314 from various data sources such as other block chain network system. The processing device 304 stores the data that it receives in its copy of the distributed ledger 314 stored in the memory device 306.

FIG. 4A illustrates a centralized database architecture environment 400, in accordance with one embodiment of the present invention. The centralized database architecture comprises multiple nodes from one or more sources and converge into a centralized database. The system, in this embodiment, may generate a single centralized ledger for data received from the various nodes. FIG. 4B provides a general block chain system environment architecture 450, in accordance with one embodiment of the present invention. Rather than utilizing a centralized database of data for instrument conversion, as discussed above in FIG. 4A, various embodiments of the invention may use a decentralized block chain configuration or architecture as shown in FIG. 4B.

A block chain is a distributed database that maintains a list of data blocks, such as real-time resource availability associated with one or more accounts or the like, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies. The data blocks recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. As such, the status of the instrument and the resources associated therewith can be validated and cleared by one participant.

The block chain system typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners" who use specialized software/equipment to create blocks. In some embodiments, the block chain system is closed, as such the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases that meets other criteria.

As mentioned above and referring to FIG. 4B, a block chain system 450 is typically decentralized—meaning that a distributed ledger 452 (i.e., a decentralized ledger) is maintained on multiple nodes 458 of the block chain 450. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains. In some embodiments, the nodes 458 of the system might be financial institutions that function as gateways for other financial institutions. For example, a credit union might hold the account, but access the distributed system through a sponsor node.

Various other specific-purpose implementations of block chains have been developed. These include distributed domain name management, decentralized crowd-funding, synchronous/asynchronous communication, decentralized real-time ride sharing and even a general purpose deployment of decentralized applications.

FIG. 5 provides a high level process flow illustrating node interaction within a block chain system environment architecture 500, in accordance with one embodiment of the present invention. As illustrated and discussed above, the block chain system may comprise at least one or more nodes used to generate blocks. The nodes as discussed with respect to FIG. 5 may be the nodes 120 of the system environment 100 discussed in FIG. 1. In some embodiments, the channel node 504, payments node 506, monitor node 516 or the clearing node 508 may publish a pending transaction 510 to the block chain 502. At this stage, the transaction has not yet been validated by the miner node(s) 512, and the other nodes will delay executing their designated processes. The miner node 512 may be configured to detect a pending transaction 510. Upon verifying the integrity of the data in the pending transaction 510, the miner node 512 validates the transaction and adds the data as a transactional record 514, which is referred to as a block to the block chain 502. Once a transaction has been authenticated in this manner, the nodes will consider the transactional record 514 to be valid and thereafter execute their designated processes accordingly. The transactional record 514 will provide information about the transaction processed and transmitted through and metadata coded therein for searchability of the transactional record 514 within a distributed ledger. The system may retain one or more rewards or cryptocurrency data associated with the execution of the process and posting of the transactional record.

In some embodiments, the system may comprise at least one additional miner node 512. The system may require that pending transactions 510 be validated by a plurality of miner nodes 512 before becoming authenticated blocks on the block chain. In some embodiments, the systems may impose a minimum threshold number of miner nodes 512 needed. The minimum threshold may be selected to strike a balance between the need for data integrity/accuracy (i.e., security/immutability) versus expediency of processing. In this way, the efficiency of the computer system resources may be maximized. In another embodiment of a permissioned block chain, a mining process may not be necessary. In this alternative embodiment, a particular number of nodes may need to agree on the new block being added to the record for the new entry to be validated and successfully added.

Furthermore, in some embodiments, a plurality of computer systems are in operative networked communication with one another through a network. The network may be a system specific distributive network receiving and distributing specific network feeds and identifying specific network associated triggers.

In some embodiments, the computer systems represent the nodes of the block chain, such as the miner node, nodes within a permissioned block chain, or the like. In such an embodiment, each of the computer systems comprise the block chain, providing for decentralized access to the block chain as well as the ability to use a consensus mechanism to verify the integrity of the data therein. In some embodiments, an upstream system and a downstream system are further operatively connected to the computer systems and each other through the network. The upstream system further comprises a ledger and the block chain. The downstream system further comprises the block chain and an internal ledger, which in turn comprises a copy of the ledger.

In some embodiments, a copy of block chain may be stored on a durable storage medium within the computer systems or the upstream system or the downstream system. In some embodiments, the durable storage medium may be RAM. In some embodiments, the durable storage medium may be a hard drive or flash drive within the system.

FIG. 6 provides a block diagram for illustrating a block chain hierarchy implementing a spiral chain architecture, in accordance with one embodiment of the present invention. A plurality of networked nodes participate within the block chain hierarchy 600 as previously described. The block chain hierarchy 600 comprises several layers or levels of interconnected chains, wherein the interconnected chains may individually have different characteristics, attributes, or permissions (i.e., a permissioned block chain) from one another. For example, in the non-limiting, illustrated embodiment, inner chain 602 is within a first privacy level separate from a second privacy level comprising an outer chain 604. Despite having disparate characteristics, the architecture of the present invention allows for the formation of connections between chains which may spiral or progress from inner levels to outer levels of the hierarchy 600. As the layers of original chains may possess different characteristics, the formed spiral chains bridge the various layers to create a network or continuum of data storage regions within the hierarchy, wherein each regions may encompass one or more chains to provide tailored characteristics for optimized storage of data. A spiral chain may bridge one or more layers of chains within the hierarchy allowing for related data for be efficiently stored on the same spiral chain despite the data having disparate data requirements.

Data stored on a block chain is typically heterogeneous and may be separated into different tiers based on data criticality or privacy requirements. The lowest tier of data comprises completely non-critical or broad data that is available to the public which may include, for example, any information discoverable through a basic web search. Next, non-public information (NPI) includes any information obtained about an individual from a transaction such as account numbers, financial statements (e.g., credit cards, loan payments, settlements, and the like), insurance information, transactional data, bank data, or the like. Personal identifying information (PII) or sensitive personal information (SPI) is information that can be used on its own or with other information to identify, contact, or locate a person or to identify an individual in context. PII is of higher criticality and more closely regulated than NPI. Examples of PII include social security number, date of birth, home address, home telephone number, driver's license number, biometric data (e.g., fingerprint, retinal scan, and the like). Finally, highly critical data may refer to data that exceeds the privacy/security requirements of the previous categories. Examples of highly critical data may include trade secrets, classified information, defense strategies, and the like. While only four tiers of data criticality are described herein, in some embodiments, data may be further categorized or tiered based on one or more characteristics such as privacy level. It should be understood that data stored on the block chain and used in the systems and process described herein is not limited to transactional data, but may also include other forms of data in other fields outside of financial environments. For example, health care data or records (e.g., patient records, DNA records, genomic records, and the like) may be stored on the block chain and benefit from the present invention.

Data requirements comprise one or more assigned or requested parameters for the data that govern placement of the data within the block chain hierarchy 600 during the data's lifetime within the hierarchy 600 and define the criticality of the data. Data may be stored on particular chains and/or within particular regions of the block chain hierarchy, as described herein, having data characteristics that match the requirements called for by or assigned to the data. Data requirements may include requirements data privacy, security, immutability, energy usage or efficiency, long-term storage, response time, and the like. Privacy requirements may include requirements for limiting exposure of the data or information to certain entities or users, (e.g., data stored within a permissioned block chain). Privacy of particular data segments may be dependent on the criticality of the data. For example, PII may require different requirements in a block chain than NPI. However, privacy, such as the privacy required by permissioned block chains, is inherently at odds with security and immutability requirements which rely on observability of the data and consensus of multiple parties (i.e., a large number of nodes) in a chain in order to validate and store a sequence of transactions in an unchangeable fashion. Observability of the data by the members of the chain is a fundamental characteristic needed for "immutability of the record" which, in essence, is not privacy preserving if attempting to reduce data exposure to a large number of other members. Energy usage or efficiency requirements may include a required amount of computing resources (e.g., number of nodes, processing power, memory, and/or bandwidth) necessary for completing operations or actions (e.g., consensus mechanisms, recording or broadcasting from the block chain, or the like) with the data which may be balanced with the energy or power required to complete said operations in a desired timeframe (i.e., response time). For example, the processing of a data set may be deemed highly important, wherein a high amount of computing resources are assigned to the data to quickly complete the processing of the data at the expense of a large expenditure of energy. Conversely, in another example, a set of data may not be deemed critically important, wherein processing operations may be completed slower in favor of a smaller expenditure of energy. It should be understood that the data requirements as discussed herein should not be considered limiting, as the invention may extend to one or more other data requirements, functionalities, and characteristics.

The interconnected spiral architecture (or multiple rings) of the hierarchy 600 are further connected and in communication with a data storage archive. The data storage archive is typically used for long-term and/or permanent data storage of, for example, retired data no longer necessary for block chain operation. The continued inclusion of older, nonessential data, which must be checked and validated upon every new recordation on the block chain, may further burden proof of work processes leading to redundant computation and energy inefficiency. In some embodiments, the data storage archive has minimal block chain characteristics. In other embodiments, the data storage archive is a conventional data storage device and does not participate on the block chain, but is in communication with the block chain hierarchy 600. Finally, as blocks (i.e., data) on the block chains grow older and criticality of data is reduced, long-term storage requirements may include conditions or requirements for retirement or permanent storage of data after a predetermined time. As discussed with respect to the following figures, long-term data storage optimize energy efficiency of data storage through trade-offs or concessions with respect to other data requirements. For example data may be retired or stored on a data storage archive that may be a low security, privacy, and energy/resource consuming device.

As illustrated in FIG. 6, the inner/outer regions of the spiral or block chain layers of the hierarchy 600 are connected and are configured to selectively or permissively communicate data and information between one another. The spiral, or in one embodiment, concentric circular construction, and dynamically configurable connections able to be formed between the various chains of the different layers of the hierarchy 600 create a continuum of regions formable across the various inner and outer chain layers of the hierarchy 600. As the spiral chains may cross and connect various levels of the hierarchy 600 based on the, the data stored on the spiral chain may selectively connect and pass through different regions of the architecture depending on the requirements of the data stored on the chain. By passing through various regions with varying characteristics, data storage on the generated spiral chain may be optimized by allowing for different blocks or data stored on the same spiral chain to be stored in appropriate regions as called for by the data requirements of each segment of data. Furthermore, as data requirements may be recalculated and change over time (e.g., older data become less critical), the spiral architecture provides a pathway to allow for continuous movement of data across the various regions, chains, or nodes of the spiral construction to accommodate the continually or gradually changing requirements of the data.

The system of the invention described herein may calculate and enforce data requirements through the use of smart contracts. Smart contracts are computer processes that facilitate, verify and/or enforce negotiation and/or performance of a contract between parties. Smart contracts typically include logic that emulates contractual clauses that are partially or fully self-executing and/or self-enforcing. The smart contracts curate the block chain hierarchy and provide guidelines for identifying data for protections and assigning data to levels of the hierarchy for predetermined periods of time. The smart contracts may further define consensus (e.g., proof of work) and encryption mechanisms for the data. The system assigns and enables different smart contracts to meet the requirements of the underlying data in terms of characteristics of the data (i.e., privacy, security, immutability, energy usage, and long-term storage). As a result, different regions of the block chain in the spiral are assigned different or even unique smart contracts to accommodate these requirements and dynamically control data storage and movement within each region and/or chain, as well as the transition or movement of data between regions over time as requirements change (e.g. when criticality of data reduces over time and the data gets transferred to less critical regions). This is done through the gradual/continuous process over the different regions in the block chain as previously described. In some embodiments, this continuous movement of data through the block chain architecture may ultimately end in a minimal permanent storage of the data archive as the final region to be settled. In some embodiments, the data archive may still be based in the block chain, but have minimal block chain characteristics.

In one example, criticality of particular data on the block chain may be reduced after 10 years, wherein the data may be moved to an outer level or region with less privacy and energy usage (i.e., computer resource usage efficiency) requirements. In this way, the storage of data within the hierarchy and operations of the block chain may be optimized through a trade-off of data requirements as data moves between different levels of the spiral architecture based on the requirements set by the user, regulating entity, or the like or as outlined by a smart contract governing the data. This continuum of regions having different data storage characteristics is further exemplified with respect to FIG. 7.

In another example, time response may be prioritized by a system or user, wherein prompt convergence of the block chain is required (e.g., time-sensitive financial transactions). In this example, efficient energy usage may be traded-off to prioritize the a fast response time, wherein data may be stored in chains and/or regions utilizing power, energy efficient computing resources that are able to complete the requested tasks within the required time-frame.

FIG. 7 provides a block diagram for illustrating one or more regions of a block chain hierarchy implementing a spiral chain architecture and data migration, in accordance with one embodiment of the present invention. As previously discussed, the block chain hierarchy comprises a continuum of regions having varying characteristics dependent on the characteristics of the chains and/or portions of chains included in each region. For example, the illustrated embodiment of FIG. 7 presents a block chain hierarchy 700 and further defines a first region (Region 1, dashed lines) having a set of characteristics of (p1, s1, i1, e1, t1) for privacy, security, immutability, energy efficiency, and time response, respectively. As illustrated in the figure, region 1 encompasses portions of chains from different levels of the hierarchy. While, region 1 in the illustrated embodiment is presented as a circle, it should be understood that regions within continuum may have any shape or may freely encompass one or more chains and/or portions of one or more chains of the block chain hierarchy.

It should be noted that data movement throughout the regions of the spiral or block chain layers may be both "inward" or "outwards," wherein the data may move omnidirectionally within the hierarchy depending on the changes to the data requirements of the data. For example, with respect to the illustrated embodiment, data may continuously move towards long-term storage in the data storage archive 702 over the lifetime of the data. Alternatively, data may also move toward regions or chains having higher data requirements or characteristics associated with higher critical data. For example, criticality of pre-existing data already stored within the hierarchy may retroactively increase in light of new technology or new security threats (e.g., a new virus, hacking strategy, or other data security threat that may target the pre-existing data). In another example, a larger, outer chain may be energy-taxing, wherein data stored on the larger chain may be moved to a smaller, more efficient chain over time.

As previously discussed, in some embodiments, regions may have smart contracts that dictate and control movement of data within each region according to the region characteristics and requirements of the data stored therein. In some embodiments, a separate smart contract may be used to govern movement on a generate spiral chain that spans multiple regions, wherein the separate, spiral smart contract controls movement of data between different regions on the spiral chain. In some embodiments, this separate smart contract may manage a full life-cycle of data or a chain (i.e., from data entry into the block chain hierarchy to data retirement and long-term storage). In this way, the separate, spiral contract may interact and coordinate with multiple chains and/or regions of the block chain hierarchy during the data/chain's lifetime.

FIG. 7 further illustrates continuous data movement across the block chain hierarchy 700 to data storage archive 702. As previously discussed, as blocks (i.e., data) or chains of data grow older and data criticality is reduced, long-term storage requirements may include conditions for retirement or permanent storage of data after a predetermined time such as in data storage archive 702. Long-term data storage optimize energy efficiency of data storage through trade-offs or concessions with respect to other data requirements. For example data may be retired or stored on a data storage archive that may be a low security, privacy, and energy/resource consuming device. In some embodiments, the data storage archive 702 may still be based on the block chain, but may have limited or minimal block chain characteristics.

FIG. 8 provides a block diagram for illustrating a shared spiral chain for a plurality of block chains, in accordance with one embodiment of the present invention. In a non-limiting, alternative embodiment of the invention as depicted in FIG. 8, a plurality of block chains 802 may share, connect, and communicate with a single, larger spiral chain 804 communally. In some embodiments, the block chain hierarchy may comprise a series of primary and secondary nodal chains wherein one or more of the primary and/or secondary nodal chains may interconnect with one or more other chains forming interconnected networks of chains or nodes and data movement pathways throughout the hierarchy. In some embodiments, blocks or chains may dynamically participate on multiple chains and/or regions. For example, a particular block may be part of a permissioned block chain while simultaneously participating on a spiral block chain spinning off from the permissioned chain. Through the dynamic configuration of the chains within the hierarchy, data may be partitioned, merged, or truncated to increase storage efficiency.

FIG. 9 provides a high level process map illustrating the implementation and initialization of a spiral block chain architecture for optimized data storage and resource usage 900, in accordance with one embodiment of the present invention. As illustrated in block 902, the process 900 is initiated by first receiving data within the block chain hierarchy. In one embodiment, data may be received within the hierarchy through the creation of a block on the block chain as a result of a pending transaction. As previously discussed, data may have varying levels of criticality which can be organized into tiers having different requirements. Data may include completely non-critical or broad data that is available to the public which may include, for example, any information discoverable through a basic web search. Non-public information (NPI) includes any information obtained about an individual from a transaction such as account numbers, financial statements (e.g., credit cards, loan payments, settlements, and the like), insurance information, transactional data, bank data, or the like. Personal identifying information (PII) or sensitive personal information (SPI) is information that can be used on its own or with other information to identify, contact, or locate a person or to identify an individual in context. PII is of higher criticality and more closely regulated than NPI. Examples of PII include social security number, date of birth, home address, home telephone number, driver's license number, biometric data (e.g., fingerprint, retinal scan, and the like). Finally, highly critical data may refer to data that exceeds the privacy/security requirements of the previous categories. Examples of extremely critical data may include trade secrets, classified information, defense strategies, and the like As illustrated in block 904, the system calculates or determines one or more data requirements of the data received into the hierarchy. As previously discussed, data requirements may include requirements regarding data privacy, security, immutability, energy usage/efficiency, long-term storage, time response, and the like. Data requirements may be assigned by a user or imported as data is entered into the system (e.g., through text entry, drop down menu, or other data entry mechanisms). The user may select or specify one or more data requirements through a user interface application operable by the user on the user device. For example, a user may select a high privacy requirement for data entered into the system, wherein the data may be assigned to a chain or one or more nodes configured for highly private information, wherein the information stored therein may have limited exposure outside of select, trusted entities at the expense of other qualities such as immutability.

In some embodiments, one or more data requirements of the data received into the hierarchy may be calculated, determined, or looked-up from one or more smart contracts, spiral contacts, and/or service level agreements (SLAs) which outline the one or more data requirements of the data and detail how the data should be treated or stored within the block chain hierarchy of the present invention.

Next, as illustrated in block 906 of FIG. 9, the system calculates one or more characteristics of various block chain configurations that form the continuum of regions within the block chain hierarchy, and at block 908, further determines an optimized block chain configuration form the previously calculated configurations for storage of the data. Calculations for discover of an optimized chain configuration include consideration for the one or more data requirements of the data (i.e., required privacy, security, immutability, energy-efficiency, long-term storage, and the like) as well as the characteristics of each configuration related to the same requirements. For example, the system may determine if a particular region is able to meet the energy-efficiency requirements of a particular portion of data. In some embodiments, optimized assignment of data may further consider region and/or chain availability within the hierarchy at any given time along with data requirements.

In some embodiments, the system may dynamically generate new connections or spiral chains within the hierarchy based on the received data. In this way, the regions and/or chains used for storage of the data within the hierarchy may be tailored and optimized specifically for the data. In some embodiments, the system may execute an optimization algorithm configured for determining one or more optimal chain configurations for the data based on the calculated data requirements and chain characteristics.

Finally, as illustrated in block 910, the system initializes one or more chains within the block chain hierarchy and assigns the data to the initialized chains and/or regions formed by the chains within the hierarchy. Through optimization of data storage through calculation and consideration of data requirements and chain/region characteristics, data is assigned to chains, regions, and/or nodes which are optimized for the specific requirements of the particular data. In some embodiments, the optimization may comprise a trade-off of data requirements. For example, in order to improve energy efficiency of storage of data, the system may store the data in a region and/or chain that prioritizes conservation of computing resources and energy in exchange for decreased data processing time (i.e., time response). In another example, after a predetermined of time, criticality of a portion of data may be reduced and then retired to a more energy efficient region of the block chain hierarchy that does not require as strict security or does not require data checks as often.

FIG. 10 provides a high level process map illustrating the storage, monitoring, and continuous migration of data within a block chain hierarchy implementing a spiral block chain architecture, in accordance with one embodiment of the present invention. As illustrated in block 1002, the process is initiated when the system first receives data within the hierarchy, such as when a block is added to a chain within the block chain hierarchy during a transaction. Similar to the steps of FIG. 9, the system calculates one or more data requirements of the data and chain configurations and assigns the data to one or more initial regions and/or chains as illustrated in blocks 1004 and 1006 respectively. Initial assignments may be based on the calculated or determine data requirements of the data and characteristics of the chain configurations, wherein the data may be optimally placed within the hierarchy by the systems.

As illustrated in block 1008, the system monitors for a change in the data requirements for the data. The system may continuously monitor the requirements of the data over time. A change in the data requirements may occur automatically after a predetermined period of time (i.e., as a chain and/or data within a chain grows older). In some embodiments, the change in the data requirements may be triggered or governed by one or more smart contracts or SLAs managing movement of the data throughout the spiral architecture of the block chain hierarchy (i.e., movement between regions or spiral chains) over time according to the predetermined conditions set forth by the smart contract or SLA. In other embodiments, the data requirements may be changed manually by a user, entity, regulating body, or the like. In one example, data having a high criticality may be prioritized for monitoring, wherein the data and changes to its requirements may be checked or monitored more frequently than less critical data.

In some embodiments, monitoring frequency may be predetermined by agreements and contracts. For example, particular data may have its requirements updated every month. In some embodiments, block chains and/or regions of the hierarchy may be monitored, wherein the chains and/or regions are dynamically assessed in search of potential changes within the chains and/or regions (e.g., new potential security threats affecting the chains/regions).

As a result of determining a change in the data requirements, a new set of data requirements are assigned to the data which, as illustrated in block 1010, may require migration of the data and assignment to one or more different chains and/or regions of the block chain hierarchy. In some embodiments, separate portions of data on a single chain may be monitored and reassigned to different chains and/or regions independent from one another to allow for optimized storage of all data.

As illustrated by the dashed arrow connecting block 1010 to 1008, monitoring and reassignment of the data within the block chain hierarchy is a continual process. Once reassigned to a new region and/or chain, the system continues to monitor the data under the one or more new data requirements and characteristics of the new region/chain, wherein the data may eventually be evaluated and assigned to yet another new region/chain. In this way, data may be migrated over time from highly critical and resource intensive regions of the block chain hierarchy to less critical, energy efficient regions or storage locations that may have more lenient requirements for privacy, security, time response, immutability and the like. For example, as illustrated in block 1012, after a predetermined amount of time, the data is eventually retired and permanently stored in the data archive for long-term storage. In this way, old or redundant data may be removed from the transactional record of the block chain to improve the efficiency of adding new entries to the chain as the number of past transactions on the ledger has been reduced (i.e., truncated). For example, a company may choose to retire all data for a particular fiscal year at the end of said year to increase the efficiency of adding new transactions. In other embodiments, data may also be truncated and/or merged as previously discussed. For example, a series of financial transactions (e.g., trades) all conducted within the same month may be merged onto the same chain after predetermined amount of time such as at the end of said month. Further, after another predetermined amount of time (e.g., a year) the same set of transactions may be moved from the chain to long-term storage, wherein the data is removed and the chain is truncated.

In some embodiments, the system may store portions of the data in different regions and/or chains within the spiral chain architecture. In this way, the spiral architecture allows for optimized storage of the data within the interconnected block chain hierarchy. For example, a data set may contain both non-critical information and PII. The system is able to parse and separate the non-critical information and the PII into separate data portions which can be stored in different regions or levels of the hierarchy depending on the different data requirements. The data portions remain linked to allow for the original data set to be later reconstructed and remain complete.

In some embodiments, the original data can be separated into different threads based on criticality, security, energy, immutability requirements, and the like. These threads can later be integrated as needed. Within this context, the system generates data identifiers for connecting the one or more separated portions of the data. Data identifiers include meta-data, hashes, data slices, signatures, data markers, and the like generated by the system from the parsed data that are used to link or connect the separated partitioned data portions and allow for the original data to be later reconstructed. The data identifiers do not contain private information of the data stored within the permissioned block chain. In some embodiments, public information may be used as a data identifier to link back to the private data stored in a permissioned block chain.

In this way, the portions of data may be linked and any actions or functions (e.g., data validation, writing, broadcasting, data movement, or the like) executed on either portion of the data registers in the other portion of the data even though they are stored within separate levels of the spiral structure.

In one embodiment, wherein a first region (or in a particular embodiment, an entire chain) is a permissioned block chain, the most private information may be assigned and stored in the first region, while the remaining, less privacy-demanding portions of the data may be stored in alternate regions within the network. As the privacy of a permissioned block chain inherently reduces immutability of the data record by limiting visibility of the data, there is a need for a method of ensuring immutability of the data while maintaining the privacy within the permissioned chain. Even though the outer, non-permissioned region does not have access to the private data within the permissioned nodal chain, the non-permissioned region still has enough data through use of the data identifiers to validate the data within the permissioned chain and preserve data immutability.

In another embodiment, the system further comprises a controller or regulator node architecture and regulatory contract process that inputs not only content of the chains, but also health, privacy, security, energy efficiency, immutability and other characteristics. The regulatory nodes collect data from multiple regions and/or chains in the system and communicate with one another other or other regulatory entities to assess the overall outlining and vulnerabilities of the system and data stored thereon. The controller may further decide on changes required in the overall system or individual components based on the overall characteristics and individual characteristics of block chains, spiral chains, and/or nodes.

In another embodiment of the invention, the system may execute adversarial outlining of one or more regions, chains, nodes, or the like of the block chain hierarchy on a systematic or continuous basis. In this way, the system may monitor the health of the data and the one or more data requirements such as privacy, security, immutability, and the like. The system may further assign a confidence score to the outlined portions of the block chain hierarchy based on the result of the outlining. In other embodiments, the system may execute the adversarial outlining on an entire chain or spiral chain of the block chain hierarchy.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system implementing a spiral block chain architecture for optimized performance and data storage, the system comprising:
   a plurality of nodes participating in a block chain hierarchy comprising a continuum of one or more interconnected regions, wherein the one or more interconnected regions in the continuum have differing data requirements for privacy, security, immutability, energy usage, time response and long-term storage; and
   a controller for dynamically generating one or more block chains for transferring and storing data across the one or more interconnected regions of the block chain hierarchy, the controller comprising one or more memory devices with computer-readable program code stored thereon, one or more communication devices connected to a network, and one or more processing devices, wherein the one or more processing devices are configured to execute the computer-readable program code to:
      receive the data within the block chain hierarchy;
      calculate one or more data requirements for the data and the one or more interconnected regions, wherein the one or more data requirements for the data comprise parameters for the data that govern placement of the data within the block chain hierarchy, and wherein the parameters comprise privacy, security, immutability, energy usage, response time, and long-term storage;
      based on calculating the one or more data requirements, determine an optimized block chain configuration for storage of the data within the one or more interconnected regions; and
      based on determining the optimized block chain configuration, assign the data to one or more of the regions defined by the optimized block chain configuration.

2. The system of claim 1, wherein the controller is further configured to:
   continuously monitor at least one of the data, the one or more block chains, and the one or more interconnected regions;
   determine a change in the one or more data requirements for the at least one of the data, the one or more block chains, and the one or more interconnected regions; and
   based on determining the change in the one or more data requirements, at least partially transfer the data across the continuum of interconnected regions, wherein the data associated with the change is stored in a new region associated with the change in the one or more data requirements.

3. The system of claim 2, wherein the system further comprises a data storage archive, wherein the controller is further configured to:
   gradually migrate the data across the continuum of interconnected regions based on the change in the one or more data requirements of the data over time; and
   transfer the data to the data storage archive for long-term storage.

4. The system of claim 2, wherein a smart contract is configured to control at least partial transfer of the data across the continuum of interconnected regions, and wherein the smart contract manages a full life-cycle of the data.

5. The system of claim 1, wherein the data stored in each of the one or more interconnected regions is controlled by a smart contract configured for each of the one or more interconnected regions.

6. The system of claim 1, wherein the controller is further configured to:
extract and parse the data received within the block chain hierarchy into one or more data threads based on the one or more data requirements of each of the one or more data threads;
generate data identifiers for linking the one or more data threads; and
store a first data thread in a first region of the continuum of interconnected regions and a second data thread in a second region of the continuum of interconnected regions, wherein an operation executed on the first data thread registers in the second data thread.

7. The system of claim 6, wherein the controller is further configured to merge the one or more data threads based on a change in the one or more data requirements or after a predetermined time period.

8. The system of claim 7, wherein the controller is further configured to transfer the merged data threads to a data storage archive, wherein the merged data threads are removed from at least one block chain and the at least one block chain is truncated.

9. The system of claim 6, wherein the controller is further configured to integrate the one or more data threads, wherein the data is reconstructed.

10. The system of claim 6, wherein the first region comprises a permissioned region, and wherein the first data thread of the data stored in the permissioned region can be validated by the second data thread of the data stored in the second region.

11. The system of claim 2, wherein monitoring the at least one of the data, the one or more block chains, and the one or more interconnected regions for changes in the one or more data requirements further comprises executing adversarial outlining on the one or more interconnected regions of the block chain hierarchy to determine a health of the at least one of the data, the one or more block chains, and the one or more interconnected regions.

12. The system of claim 1, wherein one or more blocks of the block chain hierarchy participate simultaneously on more than one block chain.

13. The system of claim 1, wherein a plurality of block chains of the block chain hierarchy share a larger block chain communally.

14. A computer-implemented method for implementing a spiral block chain architecture for optimized performance and data storage, the method comprising:
receiving data within a block chain hierarchy, the block chain hierarchy comprising a continuum of one or more interconnected regions, wherein the one or more interconnected regions in the continuum have differing data requirements for privacy, security, immutability, energy usage, and long-term storage;
calculating one or more data requirements for the data and the one or more interconnected regions, wherein the one or more data requirements for the data comprise parameters for the data that govern placement of the data within the block chain hierarchy, and wherein the parameters comprise privacy, security, immutability, energy usage, and long-term storage;
based on calculating the one or more data requirements, determine an optimized block chain configuration for storage of the data within the one or more interconnected regions; and
based on determining the optimized block chain configuration, assign the data to at least one of the one or more interconnected regions defined by the optimized block chain configuration.

15. The computer-implemented method of claim 14 further comprising:
continuously monitoring the data for changes in the one or more data requirements;
determining a change in the one or more data requirements for the data; and
based on determining the change in the one or more data requirements, at least partially transferring the data across the continuum of interconnected regions, wherein the data associated with the change is stored in a new region associated with the change in the one or more data requirements.

16. The computer-implemented method of claim 15, wherein the data is gradually migrated across the continuum of interconnected regions based on the change in the one or more data requirements of the data over time and transferred to a data storage archive for long-term storage.

17. The computer-implemented method of claim 15, wherein a smart contract is configured to control at least partial transfer of the data across the continuum of interconnected regions, and wherein the smart contract manages a full life-cycle of the data.

18. The computer-implemented method of claim 14, wherein the data stored in each of the one or more interconnected regions is controlled by a smart contract configured for each of the one or more interconnected regions.

19. A computer-implemented method for storing data on a plurality of data threads within a block chain hierarchy comprising a continuum of interconnected regions with differing data requirements for privacy, security, immutability, energy usage, time response and long-term storage, wherein one or more block chains are dynamically configured for storage and transfer of the data across the continuum of interconnected regions, the method comprising:
receiving the data within the block chain hierarchy;
extracting and parsing the data received within the block chain hierarchy into one or more data threads based on one or more data requirements of each of the one or more data threads, wherein the one or more data threads have different data requirements, wherein the one or more data requirements for the data comprise parameters for the data that govern placement of the data within the block chain hierarchy, and wherein the parameters comprise privacy, security, immutability, energy usage, time response, and long-term storage; and
storing the one or more data threads within different regions of the continuum of interconnected regions based on the different data requirements of the one or more threads.

20. The computer-implemented method of claim 19, wherein extracting and parsing the data into the one or more data threads further comprises:
generating data identifiers for linking the one or more data threads; and
storing a first data thread in a first region of the continuum of interconnected regions and a second data thread in a second region of the continuum of interconnected regions, wherein an operation executed on the first data thread registers in the second data thread.

21. The computer-implemented method of claim 19, further comprising merging the one or more data threads based on a change in the one or more data requirements or after a predetermined time period.

22. The computer-implemented method of claim 21, further comprising transferring the merged data threads to a data storage archive, wherein the merged data threads are removed from at least one block chain and the at least one block chain is truncated.

23. A system implementing a dynamically curated block chain architecture, the system comprising:
   a plurality of nodes participating in a block chain hierarchy forming a continuum of one or more interconnected regions, wherein the one or more interconnected regions in the continuum have differing data requirements; and
   a controller for executing one or more smart contracts within the block chain hierarchy, the controller being configured to:
      assign at least one smart contract to each of the one or more interconnected regions of the block chain hierarchy, wherein the at least one smart contract dynamically controls storage and movement of data within each of the one or more interconnected regions based on the differing data requirements, wherein the data requirements for the one or more interconnected regions comprise parameters that govern placement of data within the block chain hierarchy, wherein the parameters comprise privacy, security, immutability, energy usage, response time, and long-term storage,
   wherein the data have data requirements comprising parameters for the data that govern placement of the data within the block chain hierarchy, and wherein the parameters comprise privacy, security, immutability, energy usage, response time, and long-term storage.

24. The system of claim 23, wherein an additional smart contract is configured to dynamically control the movement of the data across the continuum of interconnected regions, and wherein the additional smart contract manages a full life-cycle of the data.

* * * * *